US011115661B2

(12) United States Patent
Azulai

(10) Patent No.: US 11,115,661 B2
(45) Date of Patent: Sep. 7, 2021

(54) LOW DELAY CONTENT DISARM AND RECONSTRUCTION (CDR) OF LIVE STREAMING VIDEO

(71) Applicant: International Business Machines Corporation, Armonk, NY (US)

(72) Inventor: Ophir Azulai, Tivon (IL)

(73) Assignee: International Business Machines Corporation, Armonk, NY (US)

(*) Notice: Subject to any disclaimer, the term of this patent is extended or adjusted under 35 U.S.C. 154(b) by 3 days.

(21) Appl. No.: 16/355,775

(22) Filed: Mar. 17, 2019

(65) Prior Publication Data
US 2020/0296373 A1 Sep. 17, 2020

(51) Int. Cl.
| H04L 9/00 | (2006.01) |
| H04L 1/00 | (2006.01) |
| H04L 29/06 | (2006.01) |
| H04N 19/124 | (2014.01) |
| H04N 19/44 | (2014.01) |
| H04N 19/176 | (2014.01) |

(52) U.S. Cl.
CPC ....... H04N 19/124 (2014.11); H04L 63/1441 (2013.01); H04L 65/607 (2013.01); H04N 19/176 (2014.11); H04N 19/44 (2014.11)

(58) Field of Classification Search
CPC ...... H04N 19/124; H04N 19/66; H04N 19/56; H04N 19/176; H04N 19/44; H04L 69/163; H04L 63/1441; H04L 65/607
USPC ............. 375/240.01, 240.03, 240.16, 240.27
See application file for complete search history.

(56) References Cited

U.S. PATENT DOCUMENTS

| 6,278,385 | B1* | 8/2001 | Kondo | G06T 9/008 |
| | | | | 341/200 |
| 8,887,276 | B2 | 11/2014 | Mraz et al. | |
| 10,417,951 | B2* | 9/2019 | Ando | H04N 19/503 |
| 2002/0046308 | A1* | 4/2002 | Devlin | H04N 17/004 |
| | | | | 710/65 |
| 2008/0031337 | A1* | 2/2008 | Hasegawa | H04N 19/176 |
| | | | | 375/240.16 |
| 2014/0037005 | A1* | 2/2014 | Lee | H04N 19/56 |
| | | | | 375/240.16 |
| 2015/0296213 | A1* | 10/2015 | Hellman | H04N 19/44 |
| | | | | 375/240.01 |
| 2015/0312594 | A1* | 10/2015 | Hughes | H04N 19/66 |
| | | | | 375/240.27 |
| 2019/0173935 | A1* | 6/2019 | Lohmar | H04L 69/163 |

FOREIGN PATENT DOCUMENTS

CN 101909211 12/2010

* cited by examiner

Primary Examiner — Albert Kir
(74) Attorney, Agent, or Firm — G. E. Ehrlich

(57) ABSTRACT

A method of disarming and reconstructing an encoded video stream to nullify malicious agents potentially embedded in the encoded video stream comprising decoding a received encoded video stream to obtain a decoded video stream, extracting, from the encoded video stream, encoding information calculated by an originating encoder to create the encoded video stream, adjusting the encoding information by replacing one or more quantization parameters defined in the encoding information with respective adjusted quantization parameter(s) calculated based on a random selection of a value from a range of quantization parameter values, encoding the decoded video stream using the adjusted encoding information to produce a modified encoded video stream and transmitting the modified encoded video stream.

20 Claims, 2 Drawing Sheets

LOW DELAY CONTENT DISARM AND RECONSTRUCTION (CDR) OF LIVE STREAMING VIDEO

BACKGROUND

The present invention, in some embodiments thereof, relates to Content Disarm and Reconstruction (CDR) of encoded video stream, and, more specifically, but not exclusively, to low delay CDR of streaming encoded live video stream using encoding information extracted from the encoded video and adjusted to produce a modified encoded video stream.

The ever growing reliance of modern life services, applications, systems and platforms on information technology, information sharing and distributed computing opens a wide way for cyber threats and cyber-attacks launched by malicious parties (e.g. hackers) in attempt to expose, alter, disable, destroy, steal, gain unauthorized access or make unauthorized use of such information and computer resources.

Cyber security has therefore become a major challenge and a constant race is held between the malicious parties devising malicious cyber-attacks and cyber security efforts to develop and deploy counter measures to identify, block and/or neutralize these malicious cyber-attacks.

As part of the cyber security efforts many methods, techniques and tools have been developed to focuses and take advantage of various aspects and characteristics of the cyber threats. However, since the nature, footprint, type, pattern, characteristics, effect and/or operation mode of the cyber threats is constantly changing the cyber security challenge is constantly present.

SUMMARY

According to a first aspect of the present invention there is provided a method of disarming and reconstructing an encoded video stream to nullify malicious agents potentially embedded in the encoded video stream, comprising using one or more processors for:

Decoding a received encoded video stream to obtain a decoded video stream.

Extracting, from the encoded video stream, encoding information calculated by an originating encoder to create the encoded video stream.

Adjusting the encoding information by replacing one or more quantization parameters defined in the encoding information with a respective adjusted quantization parameter(s) calculated based on a random selection of a value from a range of quantization parameter values.

Encoding the decoded video stream using the adjusted encoding information to produce a modified encoded video stream.

Transmitting the modified encoded video stream.

According to a second aspect of the present invention there is provided a system for disarming and reconstructing an encoded video stream to nullify malicious agents potentially embedded in the encoded video stream, comprising one or more processors executing a code. The code comprising:

Code instructions to decode a received encoded video stream to obtain a decoded video stream.

Code instructions to extract, from the encoded video stream, encoding information calculated by an originating encoder to create the encoded video stream.

Code instructions to adjust the encoding information by replacing one or more quantization parameters defined in the encoding information with a respective adjusted quantization parameter calculated based on a random selection of a value from a range of quantization parameter values.

Code instructions to encode the decoded video stream using the adjusted encoding information to produce a modified encoded video stream.

Code instructions to transmit the modified encoded video stream.

According to a third aspect of the present invention there is provided a computer program product for disarming and reconstructing an encoded video stream to nullify malicious agents potentially embedded in the encoded video stream, comprising:

A non-transitory computer readable storage medium.

First program instructions for decoding a received encoded video stream to obtain a decoded video stream.

Second program instructions for extracting, from the encoded video stream, encoding information calculated by an originating encoder to create the encoded video stream.

Third program instructions for adjusting the encoding information by replacing one or more quantization parameters defined in the encoding information with a respective adjusted quantization parameter calculated based on a random selection of a value from a range of quantization parameter values.

Fourth program instructions for encoding the decoded video stream using the adjusted encoding information to produce a modified encoded video stream.

Fifth program instructions for transmitting the modified encoded video stream. Wherein the first, second, third, fourth and fifth program instructions are executed by one or more processors from the non-transitory computer readable storage medium.

In a further implementation form of the first, second and/or third aspects, the received encoded video stream extracted from a received transport stream encapsulating the encoded video stream.

In a further implementation form of the first, second and/or third aspects, the modified encoded video stream is encapsulated in an output transport stream.

In a further implementation form of the first, second and/or third aspects, the encoded video stream is a live encoded video stream portraying a live event.

In a further implementation form of the first, second and/or third aspects, the encoded video stream is encoded according to a video coding protocol, for example, MPEG-1, MPEG-2, MPEG-4, H.261, H.263, H.264 and/or H.265.

In a further implementation form of the first, second and/or third aspects, the encoding information includes motion vectors, quantization parameters and macroblock types generated by the originating encoder for a plurality of frames encoded in the encoded video stream.

In a further implementation form of the first, second and/or third aspects, the quantization parameter value of the respective adjusted quantization is equal or lower than the quantization parameter value of the respective quantization parameter.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

Implementation of the method and/or system of embodiments of the invention can involve performing or completing selected tasks manually, automatically, or a combination thereof. Moreover, according to actual instrumentation and equipment of embodiments of the method and/or system of the invention, several selected tasks could be implemented by hardware, by software or by firmware or by a combination thereof using an operating system.

For example, hardware for performing selected tasks according to embodiments of the invention could be implemented as a chip or a circuit. As software, selected tasks according to embodiments of the invention could be implemented as a plurality of software instructions being executed by a computer using any suitable operating system. In an exemplary embodiment of the invention, one or more tasks according to exemplary embodiments of method and/or system as described herein are performed by a data processor, such as a computing platform for executing a plurality of instructions. Optionally, the data processor includes a volatile memory for storing instructions and/or data and/or a non-volatile storage, for example, a magnetic hard-disk and/or removable media, for storing instructions and/or data. Optionally, a network connection is provided as well. A display and/or a user input device such as a keyboard or mouse are optionally provided as well.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DETAILED DESCRIPTION

Figure 1:
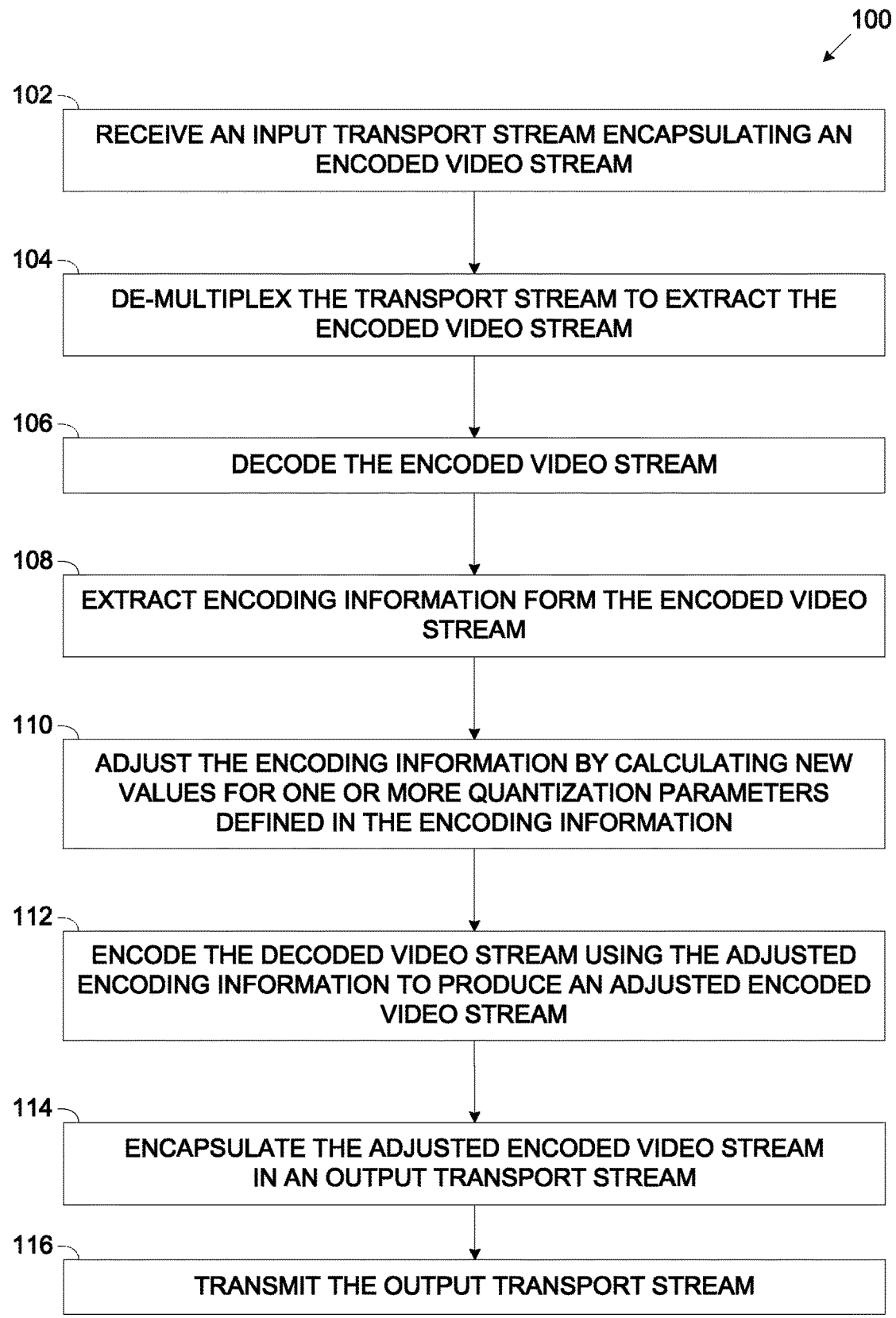
FIG. 1 is a flowchart of an exemplary process of disarming and reconstructing an encoded video stream to nullify malicious agents potentially embedded in the encoded video stream, according to some embodiments of the present invention.

The present invention, in some embodiments thereof, relates to CDR of encoded video stream, and, more specifically, but not exclusively, to low delay CDR of streaming encoded live video stream using encoding information extracted from the encoded video and adjusted to produce a modified encoded video stream.

According to some embodiments of the present invention, there are provided methods, systems and computer program products for content disarming and reconstruction (CDR) of a received encoded video stream to nullify malicious agents potentially embedded in the encoded video stream comprising a sequence of frames encoded according to one or more encoding protocols, for example, MPEG-1, MPEG-2, MPEG-4, H.261, H.263, H.264, H.265 and/or the like.

In particular, the CDR is directed to increase immunity of a secure (internal) network, for example, a private network, a company network, an organization network, a factory network, an institution network and/or the like to cyber threats originating from an external untrusted network such as, for example, the internet. As such the CDR of the to the received encoded video stream may be applied by one or more access systems and/or devices, for example, a gateway, a router, a proxy server and/or the like serving as gate between a secure (internal) network and the external untrusted network Since the encoded video stream is received from the untrusted network, one or more malicious program components, for example, a. virus, a worm, a Trojan horse, a malicious agent, a ransomware, a spyware, an adware, a scareware and/or the like may potentially reside in the received (input) encoded video streams. Such malicious program components may be configured to expose, alter, disable, destroy, steal, gain unauthorized access to and/or make unauthorized use of resources in the secure network.

During the CDR process, the received encoded video stream is first decoded to decode the encoded video then the decoded video is reconstructed, i.e., re-encoded according to the original encoding protocol(s) to produce an output encoded video stream which may be modified compared to the received encoded video stream. Since the video is decoded and then re-encoded, any redundant component, in particular, any malicious program component added, injected and/or resident in the received encoded video stream may be removed or at least altered to a degree which nullifies the malicious program component(s) thus preventing the malicious operation of the malicious program component(s).

Decoding the input encoded video stream may be relatively simple thus consuming limited computing resources such as, for example, processing power, processing time, storage resources and/or the like. However re-encoding the decoded video to produce the output encoded video stream may require significant computing resources since the encoding protocol(s) applied to compress the video stream while maintaining high video quality may be extremely resource consuming.

Compression of the video stream is primarily based on reducing the spatial and temporal redundancy between subsequent frames of the video stream. To identify and take advantage of this redundancy advanced motion estimation techniques are applied for calculating encoding information, for example, motion vectors, quantization parameters, macroblock types and/or the like to produce the encoded video stream. The motion estimation involves complex image processing and motion prediction algorithms which may require significant computing resource, for example, processing power, processing time, storage resources and/or the like which may further result in significant power consumption.

Therefore, in order to reduce the computing resources required for re-encoding the video stream to produce the output encoded video stream, the encoding information calculated by the originating encoder which encoded the received (input) encoded video stream may be extracted from the input encoded video stream and used to produce the output encoded video stream. Therefore during the CDR process, no motion estimation calculations are conducted for producing the output encoded video stream but rather the output encoded video stream is generated (encoded) using the encoding information calculated by the originating encoder.

Specifically, producing the output encoded video stream using the extracted encoding information may significantly reduce the CDR time thus significantly reducing the latency from the time of receiving the input encoded video stream to the time of transmitting the output encoded video stream. This may be of particular significance in case the encoded video stream is a live streaming encoded video stream portraying a live event.

However, a malicious party, either human and/or automated, may be able to predict a structure of the reconstructed output encoded video stream and may inject the malicious program component(s) in manner that may allow one or more of the malicious program components to endure (survive) the CDR process and maintain their malicious functionality in the output encoded video stream.

In order to prevent such exploitation, the encoding information extracted from the input encoded video stream may be adjusted before used to produce (encode) the output encoded video stream which may be modified compared to the received encoded video stream. Specifically, the encoding information may be adjusted by replacing one or more of the quantization parameters defined in the encoding information with adjusted quantization parameter(s). To ensure unpredictability of the structure and/or pattern of the modified encoded video stream, the adjusted quantization parameter(s) may be calculated based on a random selection of a value from a range and/or a group of quantization parameter values. The randomly and unpredictably modified structure and/or pattern of the modified encoded video stream may thus prevent the malicious party from injecting malicious program component(s) which may endure the CDR process or at least render such injection attempts futile.

After adjusted, the adjusted encoding information is used to produce (encode) the output encoded video stream which is thus modified to the input (received) encoded video stream. The modified encoded video stream may be then transmitted, distributed and/or provided to one or more decoding clients, for example, a server, a network node, a computing node, a computer, a smartphone and/or the like which are connected to the secure network.

The quantization parameter directly relates to the quantization step which defines the sampling rate and samples number for sampling the frames in the encoded video stream. The quantization step therefore affects the quality of the encoded video stream with relation to the bitrate of the encoded video stream. The quantization step is inversely proportional to the quality since samples rate and number is translated to quality such that the lower the quantization step the higher the video quality and vice versa, the higher the quantization step the lower the quality. However, the sampling rate and number also translates to the bitrate and the quantization step is inversely proportional to the bitrate of the encoded video stream such that the lower the quantization step the higher the bitrate and vice versa, the higher the quantization step the lower the bitrate.

In order to maintain video quality and prevent degradation of the output (and potentially modified) encoded video stream compared to the input encoded video stream, the adjusted quantization parameter is randomly selected to be equal or lower than the original quantization parameter defined in the encoding information extracted from the input encoded video stream. Since the adjusted quantization parameter is equal or lower than the original quantization parameter, a respective quantization step of modified video stream is also lower resulting in no quality degradation of the modified video stream compared to the originally received encoded video stream.

It should be stressed that producing (encoding) the modified encoded video stream using the adjusted encoding information is transparent to any decoder compliant with the encoding protocol(s) thus allowing the decoder to decode the modified video stream similarly as done for the original encoded video stream.

Applying the adjusted encoding information based CDR may present significant advantages and benefits compared to existing CDR and/or cyber security methods and systems.

First, the adjusted encoding information based CDR may remove or at least alter the structure of unknown malicious program components which may or may not reside in the encoded video streams and may have unknown footprint, pattern, characteristics, effect, operation mode and/or the like. The CDR therefore does not have to be designed and/or trained to identify known cyber threats, i.e., known malicious program components as may be done by some of the cyber security methods. Moreover, the number of such malicious program components may be extremely high leading to extensive utilization of computing resources and/or latency in the transfer of the received encoded video stream to the clients on the secure network. The adjusted encoding information based CDR on the other hand does not process the encoded video stream to identify known malicious program components and may therefore use significantly reduced computing resources as well as impose a significantly reduced latency for transferring the encoded video stream to the secure network clients. While the low latency encoded video transfer may present a major advantage for any video stream, low latency may be of even more benefit in transferring the encoded live video streams in which transfer delays may significantly reduce user experience and/or the like.

Moreover, some of the existing CDR methods may decode the received encoded video stream and then encode the decoded video to produce the output encoded video stream. As stated herein before, encoding the decoded video may require significant computing resources which may potentially lead to major latency due to the complex and resource consuming motion prediction algorithms applied to calculate the encoding information for the encoded video stream. The existing CDR methods may therefore require extensive computing resources for reconstructing the output encoded video stream and may typically inflict a significant latency in delivery of the output encoded video stream to the secure network clients. The adjusted encoding information based CDR on the other hand does not conduct any motion estimation calculations for calculating the encoding information but rather uses encoding information based on the original encoding information calculated by the origin encoder and extracted from the received encoded video stream. The adjusted encoding information based CDR may therefore significantly reduce the computing resources for reconstructing the output encoded video stream. Since the calculation time is reduced, using the adjusted encoding information based CDR may also significantly reduce the latency in delivering the received encoded video stream to the secure network clients.

Furthermore, since the adjusted encoding information based CDR is based on randomly adjusting the encoding information and using it to create the modified encoded video stream, the modified encoded video stream may have a random and unpredictable structure and/or pattern. The malicious party may not be able to predict the structure and/or pattern of the modified encoded video stream and may therefore not be able to design malicious program component(s) that when resident in the encoded video stream will endure (survive) the adjusted encoding information based CDR process.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

As will be appreciated by one skilled in the art, aspects of the present invention may be embodied as a system, method or computer program product.

Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable storage medium can be a tangible device that can retain and store instructions for use by an instruction execution device. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Computer Program code comprising computer readable program instructions embodied on a computer readable medium may be transmitted using any appropriate medium, including but not limited to wireless, wire line, optical fiber cable, RF, etc., or any suitable combination of the foregoing.

The program code for carrying out operations for aspects of the present invention may be written in any combination of one or more programming languages, including an object oriented programming language such as Java, Smalltalk, C++or the like and conventional procedural programming languages, such as the "C" programming language or similar programming languages.

The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). The program code can be downloaded to respective computing/processing devices from a computer readable storage medium or to an external computer or external storage device via a network, for example, the Internet, a local area network, a wide area network and/or a wireless network.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Referring now to the drawings, FIG. 1 is a flowchart of an exemplary process of disarming and reconstructing an encoded video stream to nullify malicious agents potentially embedded in the encoded video stream, according to some embodiments of the present invention. An exemplary process 100 may be executed to apply CDR to an encoded video stream received from an untrusted (external) origin before transferring the encoded video stream to client(s) of a secure (internal) network in order to increase immunity of the secure network to cyber threats originating from one or more malicious program components which may potentially reside in the received encoded video stream.

Figure 2:
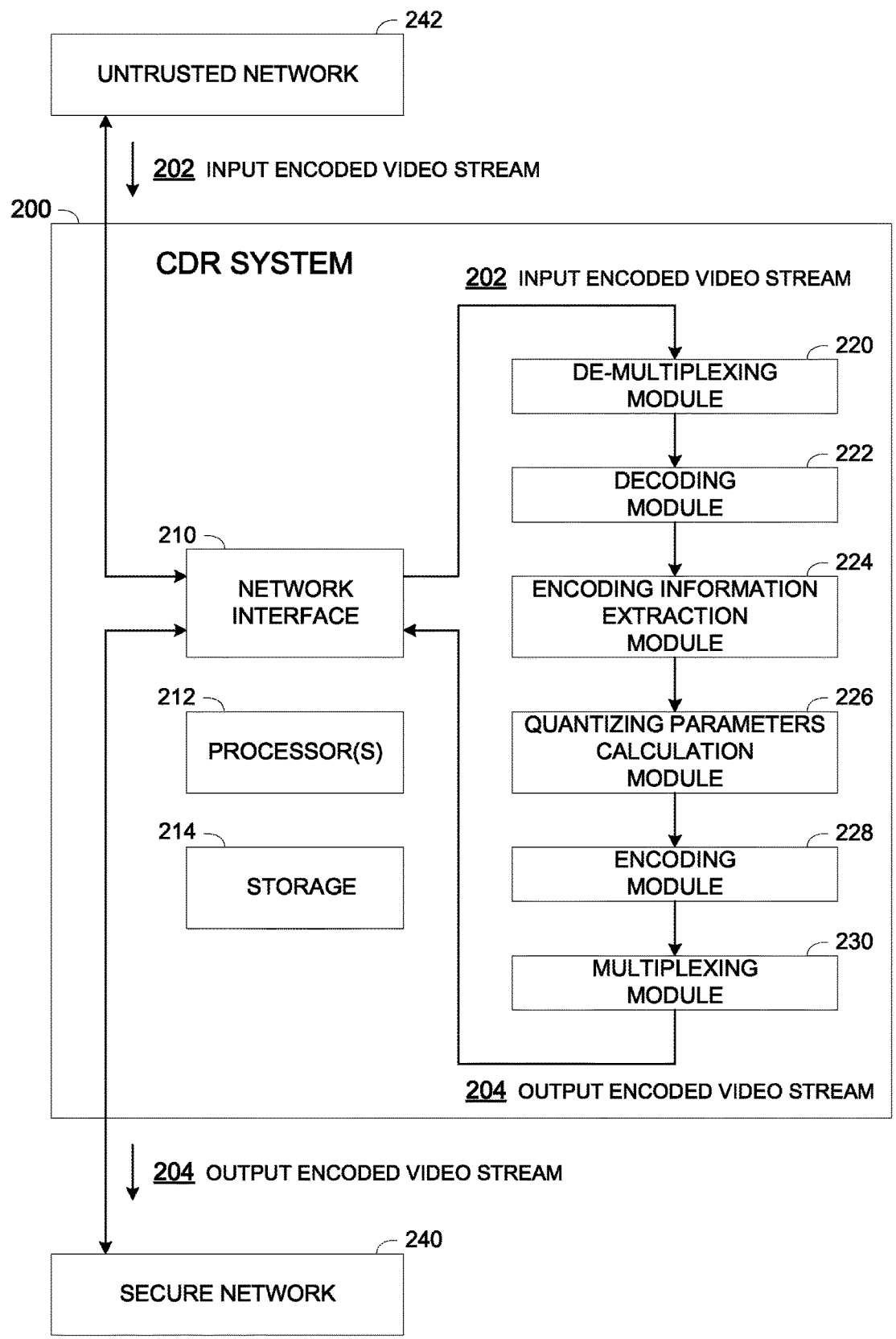
FIG. 2 is a schematic illustration of an exemplary system for disarming and reconstructing an encoded video stream to nullify malicious agents potentially embedded in the encoded video stream, according to some embodiments of the present invention.

Reference is also made to FIG. 2, which is a schematic illustration of an exemplary system for disarming and reconstructing an encoded video stream to nullify malicious agents potentially embedded in the encoded video stream, according to some embodiments of the present invention. An exemplary Content Disarm and Reconstruction (CDR) system 200, for example, a computer, a server, a computing node, a cluster of computing nodes and/or the like may execute a process such as the process 100 for disarming and reconstructing an input encoded video stream 202 and reconstructing the decode video to produce an output encoded video stream 204.

The input encoded video stream 202 comprising a sequence of frames is encoded according to one or more encoding protocols, for example, MPEG-1, MPEG-2, MPEG-4, H.261, H.263, H.264, H.265 and/or the like. The input encoded video stream 202 may be a live streaming encoded video stream which portrays a live event currently in progress, for example, a sports event, a music concert, a live show, a public performance and/or the like.

In particular, the CDR system 200 may be implemented in one or more access systems and/or devices, for example, a gateway, a router, a proxy server and/or the like serving as gate between a secure (internal) network 240, for example, a private network, a company network, an organization network, a factory network, an institution network and/or the like and an external untrusted network 242, for example, the internet.

The CDR system 200 may include a network interface 210 for receiving the input encoded video stream 202 and transmitting the output encoded video stream 204, a processor(s) 212 for executing the process 100 and storage 214 for storing code and/or data.

The network interface 210 may include one or more network interfaces for connecting to one or more wired and/or wireless networks, for example, a Local Area Network (LAN), a Wide Area Network (WAN), a Municipal Area Network (MAN), a cellular network, the internet and/or the like to facilitate communication with one or more network nodes connected to the secure network 240 as well as for communicating with one or more remote resources connected to the untrusted network 242.

The processor(s) 212 comprising one or more processor(s), homogenous or heterogeneous, each comprising one or more processing nodes arranged for parallel processing, as clusters and/or as one or more multi-core processor(s). The processor(s) 212 may further include one or more hardware specific components, for example, an Application Specific Integrated Circuit (ASIC), a Field Programmable Gate Array (FPGA), a Digital Signals Processor (DSP), a Graphic Processor Unit (GPU), a network processor and/or the like to support execution of the process 100.

The storage 214 used for storing data and/or program code may include one or more non-transitory memory devices, either persistent non-volatile devices, for example, a hard drive, a solid state drive (SSD), a magnetic disk, a Flash array and/or the like and/or volatile devices, for example, a Random Access Memory (RAM) device, a cache memory and/or the like. The storage 214 may further comprise one or more network storage resources, for example, a storage server, a Network Attached Storage (NAS), a network drive, and/or the like accessible via one or more networks through the network interface 210.

The processor(s) 212 may execute one or more software modules, for example, a process, an application, an agent, a utility, a tool, a script, an Operating System (OS) and/or the like each comprising a plurality of program instructions stored in a non-transitory medium such as the storage 214 and executed by one or more processors such as the processing circuitry 212.

The processor(s) 212 may execute one or more functional modules which may be implemented by one or more of the software modules, one or more of the hardware specific components and/or a combination thereof. The functional modules may include, for example, a de-multiplexing 220, a decoding module 222, an encoding information extraction module 224, a quantization parameters calculation module 226, an encoding module 228, a multiplexing module 230 among others.

The de-multiplexing module 220 may be configured to receive, via the network interface 210, the input encoded video stream 202 from the untrusted network 242. The input encoded video stream 202 may typically be encapsulated in an incoming transport stream which is a standard digital container format typically used by used in broadcast systems for transmission and storage of audio, video, and Program and System Information Protocol (PSIP) data. The de-multiplexing module 220 may be therefore configured to de-multiplex the incoming transport stream and extract the encapsulated input encoded video stream 202.

The decoding module 222 may be configured to decode the input encoded video stream 202 extracted from the incoming transport stream to produce a decoded video stream.

The encoding information extraction module 224 may be configured to extract, from the input encoded video stream 202, the encoding information calculated by an originating encoder which encoded and produced the input encoded video stream 202.

The quantization parameters calculation module 226 may be configured to adjust one or more quantization parameters defined in the extracted encoding information to produce adjusted encoding information.

The encoding module 228 may be configured to re-encode the video decoded from the input encoded video stream 202 using the adjusted encoding information to produce the output encoded video stream 204.

The multiplexing module 220 may be configured to encapsulate the output encoded video stream 204 in an outgoing transport stream which may be transmitted via the network interface 210 to one or more clients connected to the secure network 240.

As shown at 102, the process 100 starts with the de-multiplexing module 220 receiving the input encoded video stream 202 via the network interface 210. The encoded As the input encoded video stream 202 is typically received from the untrusted network one or more malicious program components may potentially reside in the input encoded video stream 202, for example, a virus, a worm, a Trojan horse, a malicious agent, a ransomware, a spyware, an adware, a scareware and/or the like.

As shown at 104, in case the input encoded video stream 202 is encapsulated in an incoming transport stream, the de-multiplexing module 220 may de-multiplex the incoming transport stream and extract the encapsulated input encoded video stream 202.

As shown at 106, the decoding module 222 may decode the input encoded video stream 202 to extract the video stream encoded in it.

As shown at 108, the encoding information extraction module 224 may extract the encoding information from the input encoded video stream 202. The encoding information calculated and generated by the originating encoder which encoded and produced the input encoded video stream 202 may include, for example, motion vectors, quantization parameters, macroblock types and/or the like for the input encoded video stream 202. As described herein before, the encoding information primarily relates to motion estimation and therefore generating the encoding information involves resource intensive calculations which may require significant computing resources.

As shown at 110, the quantization parameters calculation module 226 may adjust the encoding information. Specifically the quantization parameters calculation module 226 may adjust one or more of the quantization parameters defined in the encoding information for the input encoded video stream 202.

The quantization parameter directly relates to the quantization step of one or more frames of the encoded video stream and therefore affects the sampling rate and samples number of the video thus impacting quality of the encoded video with relation to bitrate of the encoded video. The quantization step is inversely proportional to the quality since samples rate and number is translated to quality such that the lower the quantization step the higher the video quality and vice versa, the higher the quantization step the lower the quality. However, the sampling rate and number also translates to the bitrate and the quantization step is inversely proportional to the bitrate of the encoded video such that the lower the quantization step the higher the bitrate and vice versa, the higher the quantization step the lower the bitrate.

The quantization parameters calculation module 226 may adjust one or more of the quantization parameters by replacing them with respective adjusted quantization parameters which are calculated based on a random selection of quantization parameter values from a range of quantization parameter values. However, the quantization parameters calculation module 226 is configured to calculate adjusted quantization parameter(s) to be equal or lower than the original quantization parameters in order to avoid degradation of quality of the output encoded video stream 204 compared to the input encoded video stream 202 after using the adjusted quantization parameter(s) to re-encode the video to produce the output encoded video stream 204.

Optionally, the quantization parameters calculation module 226 is configured to calculate adjusted quantization parameter(s) under a maximum bitrate constraint, such that the output encoded video stream 204 encoded (produced) using the adjusted quantization parameter(s) will have a bitrate which does not exceed the maximum bitrate.

For example, assuming the input encoded video stream 202 is encoded according to the H.264 encoding protocol which defines a range of 0-51 for the quantization parameters. Assuming the encoding information extracted from the input encoded video stream 202 includes a certain quantization parameter having a value of 15. In such case the quantization parameters calculation module 226 may calculate a respective adjusted quantization parameter based on a random selection of the respective adjusted quantization parameter from a certain range of quantization parameter values 10-15 which includes lower quantization parameter values to avoid degradation to video quality.

As shown at 112, the encoding module 228 encodes the video decoded from the input encoded video stream 202 to produce the output encoded video stream 204 which may typically be a modified encoded video stream compared to the input encoded video stream 202. However, the encoding module 228 does not conduct any motion estimation calculations but rather uses the adjusted encoding information which is based on the encoding information calculated by the originating encoder which produced the input encoded video stream 202. The encoding module 228 therefore requires significantly reduced computing resources for producing (encoding) the output encoded video stream 204.

As shown at 114, the multiplexing 230 may encapsulate the output encoded video stream 204 in an outgoing transport stream.

As shown at 116, the multiplexing 230 may transmit the output encoded video stream 204 optionally encapsulated in the outgoing transport stream via the network interface 210. The output encoded video stream 204 may be thus transmitted, distributed and/or delivered to one or more network nodes (clients) connected to the secure network 240. Since the output encoded video stream 204 is encoded according to the same encoding protocol(s) as the original input encoded video stream 202 the CDR process 100 may be transparent to any decoder compliant with the selected encoding protocol(s). Therefore any decoder capable of decoding the input encoded video stream 202 may be capable of decoding the output encoded video stream 204.

It is expected that during the life of a patent maturing from this application many relevant systems, methods and computer programs will be developed and the scope of the terms video encoding protocols and transport stream protocols are intended to include all such new technologies a priori.

As used herein the term "about" refers to ±10%.

The terms "comprises", "comprising", "includes", "including", "having" and their conjugates mean "including but not limited to".

The term "consisting of" means "including and limited to".

As used herein, the singular form "a", "an" and "the" include plural references unless the context clearly dictates otherwise. For example, the term "a compound" or "at least one compound" may include a plurality of compounds, including mixtures thereof.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

What is claimed is:

1. A method of decoding and re-encoding an encoded video stream to nullify malicious agents potentially embedded in the encoded video stream, comprising:
    using at least one processor for removing or altering malicious agents potentially embedded in the encoded video stream, by:
        decoding a received encoded video stream to obtain a decoded video stream;
        extracting, from the encoded video stream, encoding information calculated by an originating encoder to create the encoded video stream,
        wherein the encoding information calculated by the originating encoder includes motion estimation of motion vectors, quantization parameters, and macroblock types;
        adjusting the encoding information by replacing at least one quantization parameter defined in the encoding information with a respective adjusted quantization parameter calculated based on a random selection of a value from a pre-defined range of quantization parameter values, wherein the value randomly selected being utilized during encoding for introducing randomness to a structure of an output video stream encoded using the adjusted encoding information thereby preventing predictability of the structure, wherein the pre-defined range being configured to prevent quality degradation of the output video stream compared to the received encoded video stream,
        wherein said encoding being performed using the encoding information calculated by the originating encoder and extracted from the encoded video stream, without motion estimation calculations being conducted for producing the modified encoded video stream;
        encoding the decoded video stream using the adjusted encoding information to produce a modified encoded video stream, encoded in a same encoding protocol as an encoding protocol of the received encoded video stream; and
    transmitting the modified encoded video stream.

2. The method of claim 1, wherein the received encoded video stream extracted from a received transport stream encapsulating the encoded video stream.

3. The method of claim 1, wherein the modified encoded video stream is encapsulated in an output transport stream.

4. The method of claim 1, wherein the encoding information includes motion vectors, quantization parameters and macroblock types generated by the originating encoder for a plurality of frames encoded in the encoded video stream.

5. The method of claim 1, wherein the quantization parameter value of the respective adjusted quantization is equal or lower than the quantization parameter value of the at least one quantization parameter.

6. A system for decoding and re-encoding an encoded video stream to nullify malicious agents potentially embedded in the encoded video stream, comprising:
    at least one processor executing a code for removing or altering malicious agents potentially embedded in the encoded video stream, the code comprising:
        code instructions to decode a received encoded video stream to obtain a decoded video stream;
        code instructions to extract, from the encoded video stream, encoding information calculated by an originating encoder to create the encoded video stream,
        wherein the encoding information calculated by the originating encoder includes motion estimation of motion vectors, quantization parameters, and macroblock types;
        code instructions to adjust the encoding information by replacing at least one quantization parameter defined in the encoding information with a respective adjusted quantization parameter calculated based on a random selection of a value from a pre-defined range of quantization parameter values, wherein the value randomly selected being utilized during encoding for introducing randomness to a structure of an output video stream encoded using the adjusted encoding information thereby preventing predictability of the structure, wherein the pre-defined range being configured to prevent quality degradation of the output video stream compared to the received encoded video stream,
        wherein said encoding being performed using the encoding information calculated by the originating encoder and extracted from the encoded video stream, without motion estimation calculations being conducted for producing the modified encoded video stream;
        code instructions to encode the decoded video stream using the adjusted encoding information to produce a modified encoded video stream, encoded in a same encoding protocol as an encoding protocol of the received encoded video stream; and
        code instructions to transmit the modified encoded video stream.

7. The system of claim 6, wherein the received encoded video stream extracted from a received transport stream encapsulating the encoded video stream.

8. The system of claim 6, wherein the modified encoded video stream is encapsulated in an output transport stream.

9. The system of claim 6, wherein the encoding information includes motion vectors, quantization parameters and macroblock types generated by the originating encoder for a plurality of frames encoded in the encoded video stream.

10. The system of claim 6, wherein the quantization parameter value of the respective adjusted quantization is equal or lower than the quantization parameter value of the at least one quantization parameter.

11. A computer program product for decoding and re-encoding an encoded video stream to nullify malicious agents potentially embedded in the encoded video stream, comprising:
a non-transitory computer readable storage medium storing a plurality of program instructions for removing or altering malicious agents potentially embedded in the encoded video stream, said plurality of program instructions comprising:
first program instructions for decoding a received encoded video stream to obtain a decoded video stream;
second program instructions for extracting, from the encoded video stream, encoding information calculated by an originating encoder to create the encoded video stream,
wherein the encoding information calculated by the originating encoder includes motion estimation of motion vectors, quantization parameters, and macroblock types;
third program instructions for adjusting the encoding information by replacing at least one quantization parameter defined in the encoding information with a respective adjusted quantization parameter calculated based on a random selection of a value from a pre-defined range of quantization parameter values, wherein the value randomly selected being utilized during encoding for introducing randomness to a structure of an output video stream encoded using the adjusted encoding information thereby preventing predictability of the structure, wherein the pre-defined range being configured to prevent quality degradation of the output video stream compared to the received encoded video stream,
wherein said encoding being performed using the encoding information calculated by the originating encoder and extracted from the encoded video stream, without motion estimation calculations being conducted for producing the modified encoded video stream;
fourth program instructions for encoding the decoded video stream using the adjusted encoding information to produce a modified encoded video stream, encoded in a same encoding protocol as an encoding protocol of the received encoded video stream; and
fifth program instructions for transmitting the modified encoded video stream;
wherein the first, second, third, fourth and fifth program instructions are executed by at least one processor from the non-transitory computer readable storage medium.

12. The computer program product of claim 11, wherein the received encoded video stream extracted from a received transport stream encapsulating the encoded video stream.

13. The computer program product of claim 11, wherein the modified encoded video stream is encapsulated in an output transport stream.

14. The computer program product of claim 11, wherein the encoded video stream is a live encoded video stream portraying a live event.

15. The computer program product of claim 11, wherein the encoding information includes motion vectors, quantization parameters and macroblock types generated by the originating encoder for a plurality of frames encoded in the encoded video stream.

16. The computer program product of claim 11, wherein the quantization parameter value of the respective adjusted quantization is equal or lower than the quantization parameter value of the at least one quantization parameter.

17. The method of claim 1, wherein said encoding being performed using the encoding information calculated by an originating encoder and extracted from the encoded video stream, without motion estimation calculations being conducted for producing the modified encoded video stream.

18. The system of claim 6, wherein the modified encoded video stream being produced using the encoding information calculated by an originating encoder and extracted from the encoded video stream, without motion estimation calculations being conducted for producing thereof.

19. The computer program product of claim 11, wherein the modified encoded video stream being produced using the encoding information calculated by an originating encoder extracted from the encoded video stream, without motion estimation calculations being conducted for producing thereof.

20. The method of claim 1, wherein the adjusted quantization parameter being calculated under a maximum bitrate constraint.

* * * * *